US012327512B2

(12) United States Patent
Hong et al.

(10) Patent No.: US 12,327,512 B2
(45) Date of Patent: Jun. 10, 2025

(54) DISPLAY APPARATUS

(71) Applicant: LG Display Co., Ltd., Seoul (KR)

(72) Inventors: MooKyoung Hong, Paju-si (KR); Jinsol Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 4 days.

(21) Appl. No.: 18/485,715

(22) Filed: Oct. 12, 2023

(65) Prior Publication Data

US 2024/0212572 A1 Jun. 27, 2024

(30) Foreign Application Priority Data

Dec. 22, 2022 (KR) ........................ 10-2022-0181603

(51) Int. Cl.

| | |
|---|---|
| ***G09G 5/00*** | (2006.01) |
| ***G09G 3/20*** | (2006.01) |
| ***G09G 3/3233*** | (2016.01) |
| ***G09G 3/3258*** | (2016.01) |
| ***G09G 3/3275*** | (2016.01) |
| ***G09G 3/36*** | (2006.01) |

(52) U.S. Cl.

CPC ......... *G09G 3/2096* (2013.01); *G09G 3/3233* (2013.01); *G09G 3/3258* (2013.01); *G09G 3/3275* (2013.01); *G09G 3/3685* (2013.01); *G09G 2300/0842* (2013.01); *G09G 2330/028* (2013.01); *G09G 2330/12* (2013.01); *G09G 2370/10* (2013.01)

(58) Field of Classification Search

CPC .. G09G 3/2096; G09G 3/3233; G09G 3/3258; G09G 3/3275; G09G 3/3685; G09G 2300/0842; G09G 2330/028; G09G 2330/12; G09G 2370/10

USPC .......................................................... 345/213

See application file for complete search history.

(56) References Cited

U.S. PATENT DOCUMENTS

| | | | | |
|---|---|---|---|---|
| 2017/0154579 A1* | 6/2017 | Choi | .................... | H10K 59/179 |
| 2018/0144705 A1* | 5/2018 | Lee | ...................... | G09G 3/3225 |
| 2022/0122545 A1 | 4/2022 | Hong et al. | | |
| 2022/0208108 A1* | 6/2022 | Lee | ...................... | G09G 3/3225 |

FOREIGN PATENT DOCUMENTS

| | | |
|---|---|---|
| KR | 10-2018-0003745 A | 1/2018 |
| KR | 10-2345847 B1 | 1/2022 |

OTHER PUBLICATIONS

European Patent Office, Extended European Search Report, European Patent Application No. 23206570.6, Apr. 2, 2024, 11 pages.

* cited by examiner

*Primary Examiner* — Jennifer T Nguyen
(74) *Attorney, Agent, or Firm* — Fenwick & West LLP

(57) ABSTRACT

Disclosed is a display apparatus comprising a display panel with a plurality of data lines, a plurality of reference lines, and a plurality of subpixels arranged therein, a data driver configured to supply a data voltage to the data lines and to supply a reference voltage to the reference lines, a power supplier configured to supply a plurality of driving voltages to the data driver, and a timing controller configured to control the data driver and the power supplier and to supply a common voltage that changes between a plurality of different voltage levels that correspond to the plurality of driving voltages.

22 Claims, 7 Drawing Sheets

| | S1 | S0 | VPRER | EVREF | VRTA | GMA7 |
|---|---|---|---|---|---|---|
| Driving | 0 | 0 | V1 | - | - | V2 |
| Smode | 0 | 1 | - | V1 | - | - |
| Fmode | 1 | 0 | - | V1 | - | - |
| AVC | 1 | 1 | - | V1 | V2 | - |

DISPLAY APPARATUS

CROSS-REFERENCE TO RELATED APPLICATION

This application claims the benefit of the Republic of Korea Patent Application No. 10-2022-0181603 filed on Dec. 22, 2022, which is hereby incorporated by reference in its entirety.

BACKGROUND

Field of Technology

The present disclosure relates to a display apparatus.

Description of the Related Art

With the development of information society, the demand for a display apparatus for displaying an image is increasing in various forms. Accordingly, a display apparatus such as a liquid crystal display (LCD) device, an organic light emitting diode (OLED) display, a micro light emitting diode (LED) display apparatus, a quantum dot display (QD) display apparatus, and the like is used.

The display apparatus comprises a display panel in which a plurality of data lines and a plurality of gate lines are arranged and subpixels are defined at points where the plurality of data lines and the plurality of gate lines cross each other, a data driving circuit for driving the plurality of data lines, a gate driving circuit for driving the plurality of gate lines, and a power supply circuit for supplying power required for driving the display apparatus to the display panel.

A plurality of source drive integrated circuits (ICs) included in a data driving circuit are disposed on one side of a display panel in parallel along one side of the display panel. Power is supplied from a power supply circuit embedded in an external control printed circuit board C-PCB to each of the plurality of source drive IC facets, and the source drive IC senses characteristics of each subpixel defined in the display panel by using the supplied power or applies a voltage to each subpixel.

When the specification of the display apparatus is advanced, the number of wires and pins connected to a PIN-to-PIN is increased between the power supply circuit and the source drive IC by increasing the number and number of power sources required for driving the display panel, thereby increasing the number of wires and pins of the control PCB, the connector, the flexible flat cable (FFC), and the source PCB, and increasing the complexity of the layout to increase costs.

SUMMARY

The present disclosure has been made in view of the above problems, and it is an object of the present disclosure to provide a display apparatus capable of reducing the number of wirings and pins for input and output of power by sharing power required for driving a display panel.

An aspect of the present disclosure is directed to providing a display apparatus in which a folding characteristic and an adhesive force of the display apparatus are improved, and thus, the reliability of the display apparatus is enhanced.

In one embodiment, a display apparatus comprises: a display panel including a plurality of data lines, a plurality of reference lines, and a plurality of subpixels; a data driver configured to supply a data voltage to the plurality of data lines and to supply a reference voltage to the plurality of reference lines; a power supplier configured to supply a plurality of driving voltages to the data driver; and a timing controller configured to control the data driver and the power supplier, the power supplier being controlled by the timing controller to supply to the data driver a common voltage by sharing at least a portion of the plurality of driving voltages.

In one embodiment, a display apparatus comprises: a display panel including a plurality of data lines, a plurality of reference lines, and a plurality of subpixels; a power supplier configured to generate a first common reference voltage and a second common reference voltage; and a data driver configured to supply a data voltage to the plurality of data lines and to supply a reference voltage to the plurality of reference lines based on the first common reference voltage and the second common reference voltage, the data driver receiving the first common reference voltage via a first wiring and the second common reference voltage via a second wiring that is different from the first wiring, wherein a voltage level of the first common reference voltage and a voltage level of the second common reference voltage changes in accordance with a selected mode of operation from a plurality of different modes of operation of the display apparatus.

Details of other embodiments are included in the detailed description and the drawings.

The display apparatus according to the embodiment of the present disclosure may reduce the number of wires and pins for input and output of power by sharing power required for driving the display panel so that it is possible to reduce the number of wires and pins of the control PCB, connector, FFC, and source PCB, and to simplify the PCB layout. Accordingly, costs of the display apparatus may be reduced, and noise caused by the voltage of PCB may be reduced.

The details of the present disclosure described in technical problem, technical solution, and advantageous effects do not specify essential features of claims, and thus, the scope of claims is not limited by the details described in detailed description of the invention.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
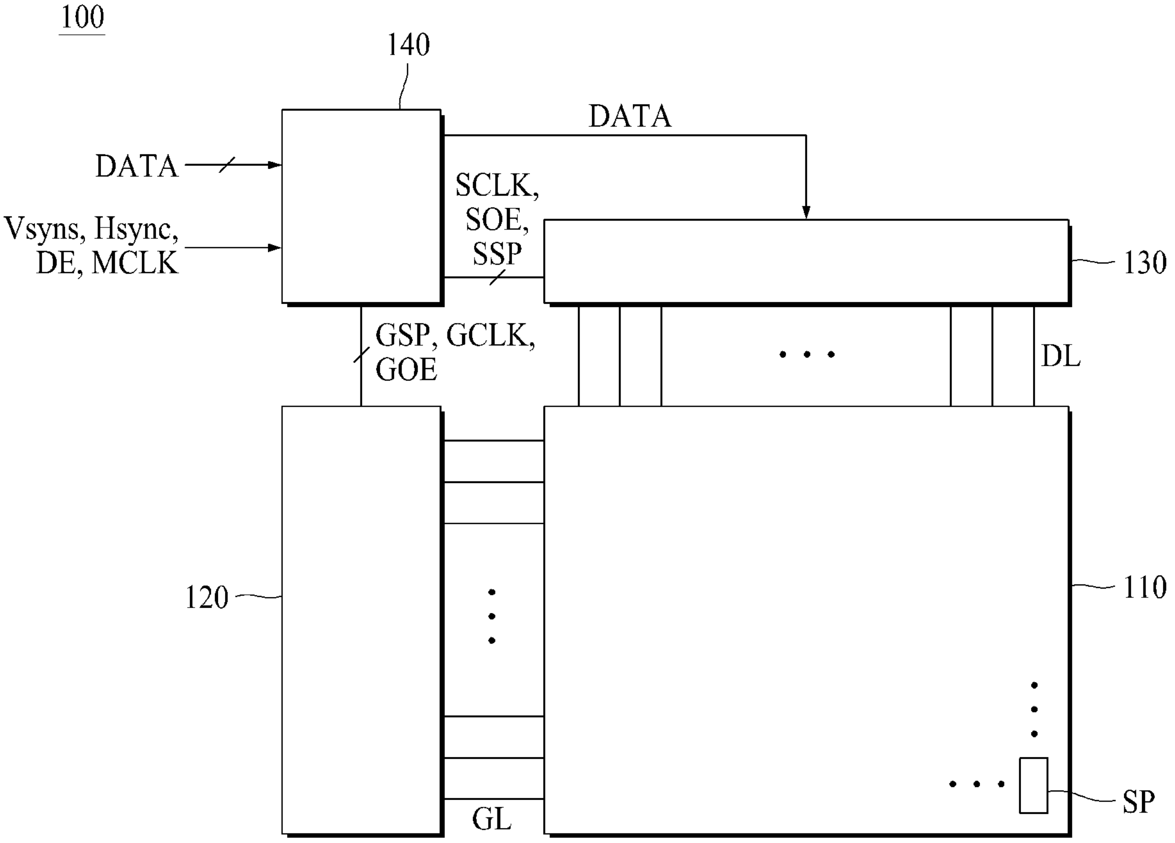
FIG. 1 is a block diagram schematically illustrating a display apparatus according to the embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first", "second", etc. may be used herein to describe various elements, these elements should not be limited by these terms. These terms are only used to partition one element from another. For example, a first element could be termed a second element, and, similarly, a second element could be termed a first element, without departing from the scope of the present invention.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a preferred embodiment of a display apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

FIG. 1 is a block diagram schematically illustrating a display apparatus according to the embodiment of the present disclosure.

Referring to FIG. 1, a display apparatus 100 according to the embodiment of the present disclosure may comprise a display panel 110 provided with a plurality of gate lines GL and a plurality of data lines DL connected thereto, and provided with a plurality of subpixels arranged in a matrix form, a gate driver 120 for driving the plurality of gate lines GL, a data driver 130 for supplying a data voltage through the plurality of data lines DL, and a timing controller 140 for controlling the gate driver 120 and the data driver 130.

The display panel 110 may display an image based on a scan signal transmitted from the gate driver 120 through the plurality of gate lines GL and a data voltage transmitted from the data driver 130 through the plurality of data lines DL.

In case of the LCD apparatus, the display panel 110 includes a liquid crystal layer formed between two substrates. The display panel 110 may be operated in any known mode such as a twisted nematic (TN) mode, a vertical alignment (VA) mode, an in plane switching (IPS) mode, a fringe field switching (FFS) mode, and the like. In case of the organic light emitting display apparatus, the display panel 110 may be implemented in a top emission type, a bottom emission type, a dual emission type, or the like.

The display panel 110 may include a plurality of pixels arranged in a matrix form, wherein each pixel includes subpixels SP of different colors, for example, a white subpixel, a red subpixel, a green subpixel, and a blue subpixel, and each subpixel SP may be defined by the plurality of data lines DL and the plurality of gate lines GL.

Herein, one subpixel SP may include a thin film transistor TFT formed in an intersection area of one data line DL and one gate line GL, a light emitting element such as an organic light emitting diode for charging the data voltage, a storage capacitor electrically connected to the light emitting element to maintain a voltage, and the like.

For example, when the display apparatus 100 with resolution of 2,160×3,840 is composed of four subpixels SP of white W, red R, green G, and blue B, 15,360 data lines DL (3,840×4=15,360) may be provided by 2,160 gate lines GL and 3,840 data lines DL respectively connected to the four subpixels WRGB, and each subpixel SP may be disposed in the intersection area of the gate line GL and the data line DL.

The gate driver 120 is controlled by the timing controller 140. The gate driver 120 sequentially outputs scan signals to the plurality of gate lines GL disposed on the display panel 110, to thereby control driving timings of the plurality of subpixels SP.

In the display apparatus 100 with resolution of 2,160×3,840, a case where the scan signal is sequentially output from the first gate line to the 2160th gate line may be referred to as 2,160 phase (2,160 phase) driving. Alternatively, the scan signal is sequentially output from the first gate line to the fourth gate line, and then the scan signal is sequentially output from the fifth gate line to the eighth gate line. That is, a case where the scan signal is sequentially output in units of four gate lines GL may be referred to as 4 phase driving. In other words, a case where the scan signal is sequentially output for each of the N gate lines GL may be referred to as N-phase driving.

The gate driver 120 may include at least one gate driving integrated circuit GDIC. The gate driver 120 may be located on only one side of the display panel 110 or on both sides of the display panel 110 according to a driving method. Alternatively, the gate driver 120 may be embedded in a bezel area of the display panel 110 to be implemented in the form of gate in panel (GIP).

The data driver 130 may receive digital image data DATA from the timing controller 140 and may convert the received digital image data DATA into an analog data voltage. Then, the data voltage is output to each data line DL in accordance with the timing at which the scan signal is applied through the gate line GL so that each subpixel SP connected to the data line DL may display an emission signal of luminance corresponding to the data voltage.

The data driver 130 may include at least one source driving integrated circuit SDIC, and the source driving integrated circuit SDIC may be connected to a bonding pad of the display panel 110 or may be directly disposed on the display panel 110 by a tape automated bonding TAB method or a chip on glass COG method.

For example, each source driving integrated circuit SDIC may be integrated and arranged in the display panel 110. In addition, each source driving integrated circuit SDIC may be implemented in a chip on film (COF) method. In this case, each source driving integrated circuit SDIC may be mounted on a circuit film and may be electrically connected to the data line DL of the display panel 110 through the circuit film.

The timing controller 140 may supply various control signals to the gate driver 120 and the data driver 130 and may control the operation of the gate driver 120 and the data driver 130. For example, the timing controller 140 may control the gate driver 120 to output the scan signal according to timing implemented in each frame and may transmit the digital image data DATA received from the outside to the data driver 130.

The timing controller 140 may receive various timing signals including a vertical synchronization signal Vsync, a horizontal synchronization signal Hsync, a data enable signal DE, and a main clock signal MCLK from the outside (for example, host system) together with the digital image data DATA. Accordingly, the timing controller 140 may generate a control signal using the various timing signals received from the outside and may transmit the control signal to the gate driver 120 and the data driver 130.

For example, in order to control the gate driver 120, the timing controller 140 may output various gate control signals including a gate start pulse GSP, a gate clock GCLK, a gate output enable signal GOE, and the like. For example, the gate start pulse GSP may control the timing at which one or more gate driving integrated circuits GDIC constituting the gate drive 120 start to operate. Also, the gate clock GCLK is a clock signal commonly input to one or more gate driving integrated circuits GDIC and may control the shift timing of the scan signal. Further, the gate output enable signal GOE may specify timing information of one or more gate driving integrated circuits GDIC.

In order to control the data driver 130, the timing controller 140 may output various data control signals including a source start pulse SSP, a source sampling clock SCLK, a source output enable signal SOE, and the like. For example, the source start pulse SSP may control the timing at which one or more source driving integrated circuits SDICs constituting the data driver 130 start the data sampling. The source sampling clock signal SCLK may be a clock signal for controlling the timing of sampling the data in the source driving integrated circuit SDIC. The source output enable signal SOE may control the output timing of the data driver 130.

The display apparatus 100 according to the embodiment of the present disclosure may include a power management integrated circuit for supplying various voltages or currents to the display panel 110, the gate driver 120, and the data driver 130 or controlling various voltages or currents to be supplied thereto.

The subpixel SP arranged in the display panel 110 of the display apparatus 100 according to the embodiment of the present disclosure is located at the intersection point of the gate line GL and the data line DL, and each subpixel SP may be composed of a light emitting element and a circuit element such as a driving transistor for emitting light. For example, the display apparatus 100 may include the light emitting element such as an organic light emitting diode OLED in each of the subpixels SP, and may display an image by controlling a current flowing through the light emitting element on the basis of voltage difference between the data voltage and a reference voltage.

Figure 2:
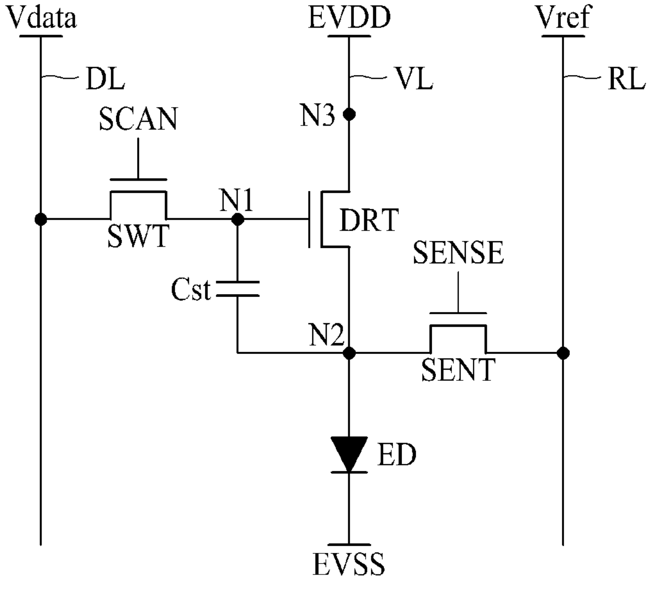
FIG. 2 is a circuit diagram illustrating a configuration of a subpixel in a display apparatus according to the embodiment of the present disclosure.

FIG. 2 is a circuit diagram illustrating a configuration of a subpixel in a display apparatus according to the embodiment of the present disclosure.

Referring to FIG. 2, in a display apparatus 100 according to the embodiment of the present disclosure, a subpixel SP may include one or more transistors and a capacitor, and an organic light emitting diode OLED may be disposed as a light emitting element ED.

The subpixel SP may include a driving transistor DRT, a switching transistor SWT, a sensing transistor SENT, a storage capacitor Cst, and a light emitting element ED.

The driving transistor DRT may include a first node N1, a second node N2, and a third node N3. The first node N1 of the driving transistor DRT may be a gate node to which a data voltage Vdata is applied from a data driver 130 through a data line DL when the switching transistor SWT is turned-on. The second node N2 of the driving transistor DRT may be electrically connected to an anode electrode of the light emitting element ED and may be a source node or a drain node. The third node N3 of the driving transistor DRT may be electrically connected to a driving voltage line VL to which a driving voltage EVDD is applied, and may be a drain node or a source node.

For a display driving period, the driving voltage EVDD required to display an image may be supplied to the driving voltage line VL. For example, the driving voltage EVDD required to display an image may be 27V.

The switching transistor SWT is electrically connected between the first node N1 and the data line DL of the driving transistor DRT. A gate line GL is connected to the gate node, whereby the gate node may operate according to a scan signal supplied through the gate line GL. In addition, when the switching transistor SWT is turned-on, the data voltage Vdata supplied through the data line DL is transferred to the gate node of the driving transistor DRT, thereby controlling an operation of the driving transistor DRT.

The sensing transistor SENT is electrically connected between the second node N2 of the driving transistor DRT and a reference line RL. The gate line GL is connected to the gate node, whereby the gate node may operate according to a sense signal SENSE supplied through the gate line GL. When the sensing transistor SENT is turned-on, a reference voltage supplied through the reference line RL may be transferred to the second node N2 of the driving transistor DRT.

That is, the voltage in the first node N1 and the voltage in the second node N2 of the driving transistor DRT may be controlled by controlling the switching transistor SWT and the sensing transistor SENT so that the current for driving the light emitting element ED may be supplied.

The gate node of the switching transistor SWT and the sensing transistor SENT may be connected to one gate line GL or may be connected to the different gate lines GL. Herein, the switching transistor SWT and the sensing transistor SENT are connected to the different gate lines GL. In this case, the switching transistor SWT and the sensing transistor SENT may be independently controlled by the scan signal SCAN and the sense signal SENSE transmitted through the different gate lines GL.

When the switching transistor SWT and the sensing transistor SENT are connected to one gate line GL, the switching transistor SWT and the sensing transistor SENT may be simultaneously controlled by the scan signal SCAN or the sense signal SENSE transmitted through one gate line GL, whereby an aperture ratio of the subpixel SP may be increased.

On the other hand, the transistor disposed in the subpixel SP may be formed of a P-type transistor as well as an N-type transistor. Herein, an example in which the transistor is composed of the N-type transistor is illustrated.

The storage capacitor Cst is electrically connected between the first node N1 and the second node N2 of the driving transistor DRT, wherein the storage capacitor Cst may maintain the data voltage Vdata during one frame.

The storage capacitor Cst may be connected between the first node N1 and the third node N3 of the driving transistor DRT according to the type of the driving transistor DRT. The anode electrode of the light emitting element ED may be electrically connected to the second node N2 of the driving transistor DRT, and a base voltage EVSS may be applied to a cathode electrode of the light emitting element ED.

For example, the base voltage EVSS may be a ground voltage or a voltage higher or lower than the ground voltage. In addition, the ground voltage EVSS may be varied according to the driving state. For example, the ground voltage EVSS at the display driving time and the ground voltage EVSS at the sensing driving time may be set to be different from each other.

The structure of the subpixel SP described in the above example is a 3T (transistor) 1C (capacitor) structure, which is merely an example for explanation. The subpixel SP may further include one or more transistors, or may further include one or more capacitors, if needed. Alternatively, each of the plurality of subpixels SP may have the same structure, and some of the plurality of subpixels SP may have the different structures.

The display apparatus 100 according to the embodiment of the present disclosure may use a method for measuring a current flowing by a voltage charged in the storage capacitor Cst in a characteristic value sensing period of the driving transistor DRT in order to effectively sense a characteristic value of the driving transistor DRT, for example, threshold voltage or mobility.

That is, the change in the characteristic value or the characteristic value of the driving transistor DRT in the subpixel SP may be determined by measuring the current flowing by the voltage charged in the storage capacitor Cst in the characteristic value sensing period of the driving transistor DRT.

In this case, the reference line RL transfers the reference voltage Vref. In addition, the reference line RL may serve as a sensing line for sensing the characteristic value of the driving transistor DRT in the subpixel SP, whereby it may be referred to as a sensing line.

Figure 3:
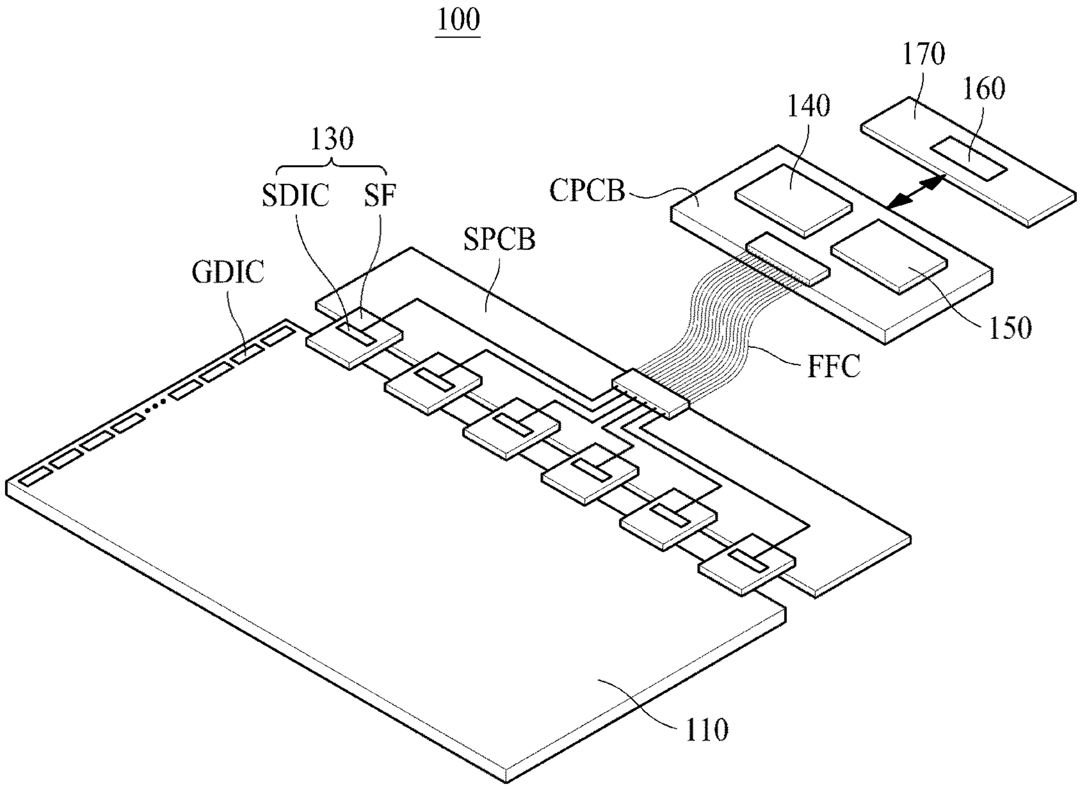
FIG. 3 shows a system of a display apparatus according to embodiments of the present disclosure.

FIG. 3 shows a system of a display apparatus according to embodiments of the present disclosure.

Referring to FIG. 3, a display apparatus 100 according to embodiments of the present disclosure shows a case in which a source driving integrated circuit SDIC included in a data driver 130 is implemented in a chip on film COF method among various methods TAB, COG, COF, etc., and a gate driver 120 is implemented in the form of Gate In Panel GIP among various methods TAB, COG, COF, GIP, etc.

When the gate driver 120 is implemented in the form of GIP, a plurality of gate driving integrated circuits GDIC included in the gate driver 120 may be directly formed in a non-display area of a display panel 110. For example, the gate driving integrated circuit GDIC may be supplied with various signals (clock signals, gate high signals, gate low signals, etc.) necessary for generating a scan signal through gate driving-related signal wiring disposed in the non-display area.

In addition, at least one source driving integrated circuit SDIC included in the data driver 130 may be mounted on a source film SF, and one side of the source film SF may be electrically connected to the display panel 110. Also, wirings for electrically connecting the source driving integrated circuit SDIC to the display panel 110 may be disposed on the source film SF.

The display apparatus 100 may comprise at least one source printed circuit board SPCB for a circuit connection between the plurality of source driving integrated circuits SDIC and other devices, and a control printed circuit board CPCB for mounting control components and various electric devices.

At least one source printed circuit board SPCB may be connected to the other side of the source film SF on which the source driving integrated circuit SDIC is mounted. For example, the source film SF on which the source driving integrated circuit SDIC is mounted may have one side electrically connected to the display panel 110 and the other side electrically connected to the source printed circuit board SPCB.

A timing controller 140 and a power management integrated circuit PMIC 150 may be mounted on the control printed circuit board CPCB. The timing controller 140 may control operations of the data driver 130 and the gate driver 120. The power management integrated circuit PMIC 150 may supply driving a voltage or current to the display panel 110, the data driver 130, and the gate driver 120, or may control the supplied voltage or current.

At least one source printed circuit board SPCB and the control printed circuit board CPCB may be electrically connected through at least one connection member, and the connection member can be a flexible flat cable FFC. For example, the connection member may be a flexible printed circuit FPC. Also, at least one source printed circuit board SPCB and the control printed circuit board CPCB may be integrated into a single printed circuit.

The display apparatus 100 may further include a set board 170 electrically connected to the control printed circuit board CPCB. For example, the set board 170 may be referred to as a power board. A main power management circuit M-PMC 160 for managing the entire power of the display apparatus 100 may exist in the set board 170. The main power management circuit 160 may be interlocked with the power management integrated circuit 150.

Figure 4:
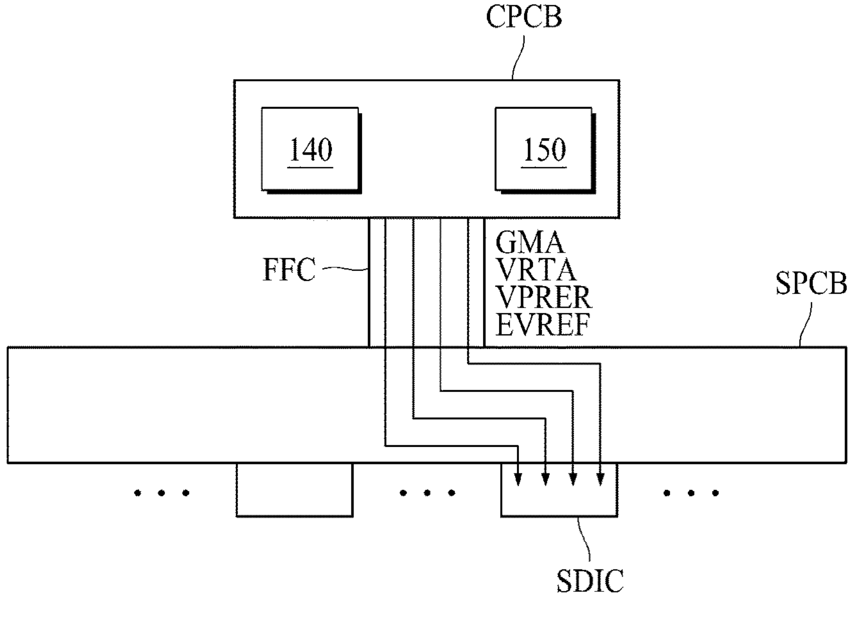
FIG. 4 is a diagram exemplarily illustrating a power wiring structure between a control printed circuit board and a source printed circuit board in the system of the display apparatus of FIG. 3 according to embodiments of the present disclosure.

FIG. 4 is a diagram exemplarily illustrating a power wiring structure between the control printed circuit board and the source printed circuit board in the system of the display apparatus of FIG. 3.

Referring to FIG. 4, in the system of the display apparatus 100, each source driving integrated circuit SDIC in the source printed circuit board SPCB may receive various driving voltages required for the display driving and sensing driving of the display panel 110 from the power management integrated circuit 150 in the control printed circuit board CPCB. The power management integrated circuit 150 may transmit various driving voltages required for the display driving and sensing driving to the source printed circuit board SPCB through the flexible flat cable FFC by a PIN-to-PIN method.

The power management integrated circuit 150 generates and outputs various driving voltages required for the operation of all circuit configurations of the display apparatus 100 by using an input voltage supplied from the outside. For example, the power management integrated circuit 150 may generate and output various driving voltages required for the operation of the display panel 110, the gate driver 120, the data driver 130, the timing controller 140, and the like. For example, the power management integrated circuit 150 may generate DC power sources such as a plurality of gamma reference voltages GMA which are a reference of a gamma curve, a sampling reference voltage required for the sensing driving, a display reference voltage required for the display driving, and a thermal characteristic sensing voltage VRTA required for a thermal characteristic sensing driving of an analog-to-digital converter by adjusting an input voltage from the outside, that is, set board 170, and may supply the generated DC power sources to each source driving integrated circuit SDIC through individual PIN and wiring.

Figure 5:
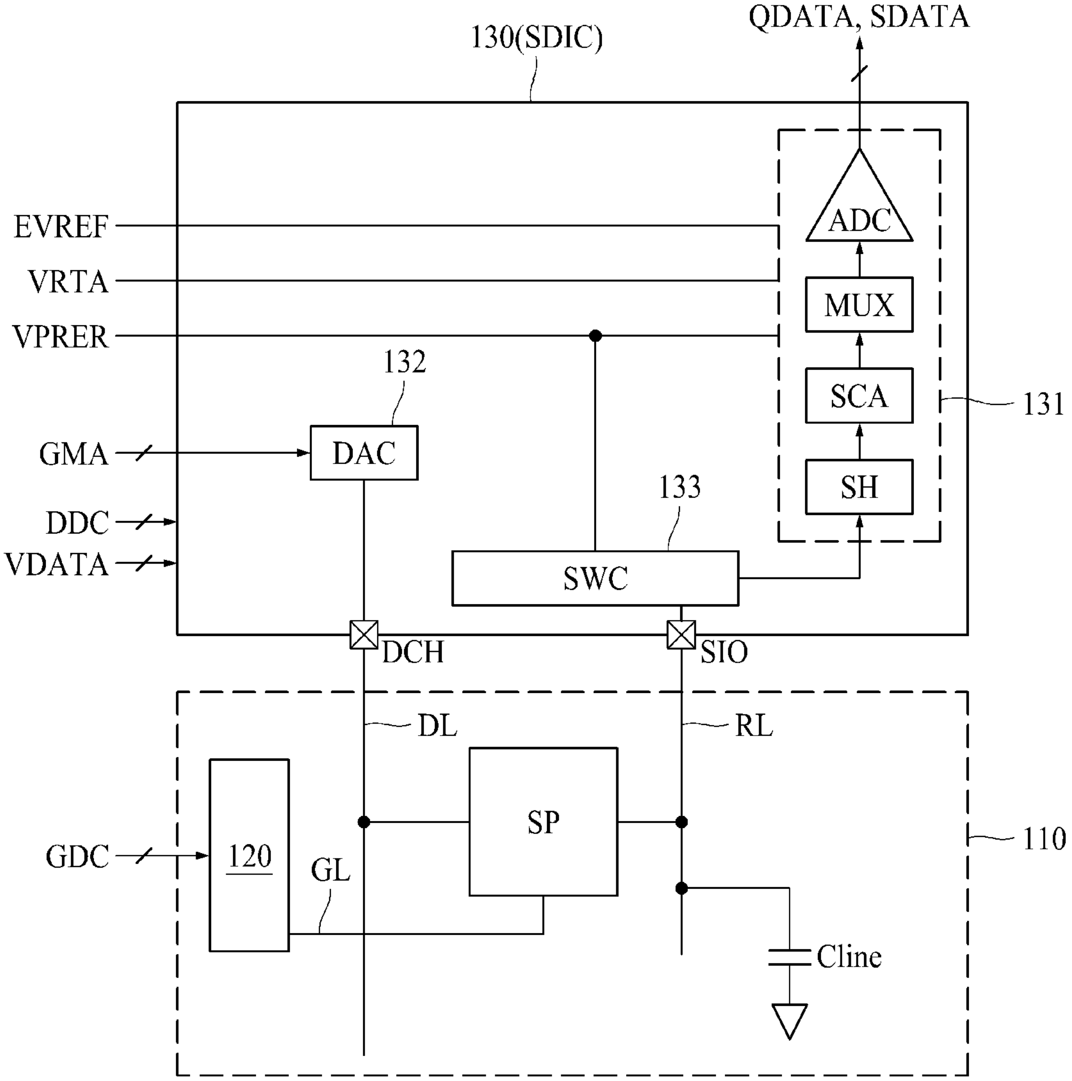
FIG. 5 is a diagram illustrating a configuration of a data driver to which the power wiring structure of FIG. 4 is applied according to embodiments of the present disclosure.

FIG. 5 is a diagram illustrating a configuration of the data driver to which the power wiring structure of FIG. 4 is applied according to one embodiment.

Referring to FIG. 5, the data driver 130 (or source driving integrated circuit SDIC) may be connected to the first node N1 (connected to the gate node of the driving transistor) of the subpixel SP through the data line DL, and may be connected to the second node N2 of the subpixel SP (connected to the source node of the driving transistor) through the reference line RL.

The second node N2 of the subpixel SP is charged with a source voltage in which the driving characteristic of the subpixel SP is reflected, whereby the reference line RL connected to the second node N2 through the sensing transistor may be used as the sensing line. A line capacitor Cline for storing the source voltage may be connected to the reference line RL functioning as the sensing line.

The data driver 130 may include a sensing portion 131 (e.g., a circuit), a data voltage generating portion 132 (e.g., a circuit), a switch circuit SWC 133, and the like.

The data voltage generating portion 132 may be connected to the data line DL of the display panel 110 through a data channel DCH. The data voltage generating portion 132 may be implemented as a digital-to-analog converter DAC configured to generate the data voltage for the display driving and the sensing driving.

The data voltage generating portion 132 receives a data timing control signal DDC and digital image data VDATA from the timing controller 140, latches the digital image data VDATA, converts the latched digital image data VDATA into an analog data signal, and supplies the analog data signal to the data line DL of the display panel 110 through a data channel terminal DCH. For example, the data voltage generating portion 132 may subdivide the received data into a plurality of grayscale voltages corresponding to grayscale values of data using a plurality of gamma reference voltages GMA supplied from the power management integrated circuit 150, may convert the digital image data VDATA into the analog data voltage by using the subdivided grayscale voltages, and may supply the data voltage to each of the data lines DL of the display panel 110. The plurality of gamma reference voltages GMA may respectively have different voltage levels. In case of the specific gamma reference voltage GMA7 among the plurality of gamma reference voltages, a voltage range of 4V~5V may be set. In addition, the data voltage generating portion 132 may generate a preset sensing data voltage during the sensing driving and may supply the sensing data voltage to the data line DL of the display panel 110 through the data channel terminal DCH.

The switch circuit SWC 133 may be connected to a display reference voltage input terminal connected to the source printed circuit board SPCB through the flexible flat cable FFC in the PIN-to-PIN method from the control printed circuit board CPCB and may receive a display reference voltage VPRER. The switch circuit SWC 133 may supply the display reference voltage VPRER to the reference line RL of the display panel 110 through a sensing channel terminal SIO for a setup operation during the display driving. The display reference voltage VPRER may be a setup voltage applied to the second node N2 which is the source node of the driving transistor DRT of the subpixel SP when the display is driven. The display reference voltage VPRER may be a voltage which is variable by the power management integrated circuit 150. For example, the display reference voltage VPRER may be a voltage which is variable by the power management integrated circuit 150 under the control of the timing controller 140.

The sensing portion 131 may be connected to the sensing channel terminal SIO for the sampling operation during the sensing driving. The sensing portion 131 is connected to the display reference voltage input terminal and sampling reference voltage terminal connected to the source printed circuit board SPCB through the flexible flat cable FFC from the control printed circuit board CPCB by the Pin-to-Pin method, and then may be supplied with the display reference voltage VPRER and sampling reference voltage EVREF.

The sampling reference voltage EVREF may be a voltage which is variable by the power management integrated circuit 150. For example, the sampling reference voltage EVREF may be a voltage variable by the power management integrated circuit 150 under the control of the timing controller 140. The sampling reference voltage EVREF may be varied to different voltage levels according to a sensing mode of the sensing driving. The sensing mode of the sensing driving may include a first sensing mode (or Smode sensing) for sensing the threshold voltage of the driving transistor DRT of the subpixel SP and a second sensing mode (or Fmode sensing) for sensing the mobility of the driving transistor DRT of the subpixel SP. The sampling reference voltage EVREF may be set as a first sampling reference voltage value in the first sensing mode, and may be set as a second sampling reference voltage value that is less than the first sampling reference voltage in the second sensing mode. For example, the first sampling reference voltage value may be set to a voltage of 3V, and the second sampling reference voltage value may be set to a voltage of 0.5V. For example, the power management integrated circuit 150 may output the sampling reference voltage EVREF with a level that is set according to the sensing mode of the sensing driving. The power management integrated circuit 150 may output the sampling reference voltage EVREF variable under the control of the timing controller 140.

The sensing portion 131 may include a sample and hold portion SH (e.g., a circuit), a scaling portion SCA (e.g., a circuit), a multiplexor portion MUX, an analog-to-digital converter ADC, and the like. The scaling portion SCA and the MUX portion MUX may be omittable in other embodiments.

The sample and hold portion SH may be connected to the sampling reference voltage terminal and may be supplied with the sampling reference voltage EVREF. The sample and hold portion SH may include a sampling capacitor which stores the voltage of the second node N2 of the driving transistor DRT of the subpixel SP input from the sensing channel terminal SIO in a first sensing sequence in which the scan signal applied to the subpixel SP maintains an on-level.

The scaling portion SCA receives the voltage stored in the sample and hold portion SH and performs a level conversion on the input voltage according to the sensing range of the analog-to-digital converter ADC. The MUX portion MUX multiplexes outputs of the scaling portion SCA and supplies the multiplexed outputs to the analog-to-digital converter ADC in accordance with an output order.

The analog-to-digital converter ADC is connected to the sampling reference voltage terminal and is supplied with the sampling reference voltage EVREF. The analog-to-digital converter ADC may convert the analog outputs input from the scaling portion SCA into a digital value and may output result data SDATA by the sensing driving.

In the analog-to-digital converter ADC, the output characteristic may vary according to a temperature. To overcome this, the data driver 130 may include a Real Time ADC Offset Compensation RTAOC function to reflect the offset characteristic of the analog-to-digital converter ADC in which the temperature change of the data driver 130 is reflected in real time.

The sensing portion 131 of the data driver 130 is connected to a thermal characteristic sensing voltage input terminal connected from the control printed circuit board CPCB to the source printed circuit board SPCB through the flexible flat cable FFC in the PIN-to-PIN method and is then configured to receive a thermal characteristic sensing voltage VRTA.

The sensing portion 131 may transmit the thermal characteristic sensing voltage VRTA, which is provided from the power management integrated circuit 150 in the thermal characteristic sensing mode, to the analog-to-digital converter ADC, and may output the output data sampled by the analog-to-digital converter ADC as output characteristic data QDATA of the analog-to-digital converter ADC. The thermal characteristic sensing voltage VRTA may be set to a voltage of about 5V, for example, 4.5V. The thermal characteristic sensing voltage VRTA may be a voltage generated by the power management integrated circuit 150.

In case of the display apparatus 100 configured as above, the data driver 130 is supplied with various driving powers required for driving the display panel 110 while being connected to the power management integrated circuit 150 in the PIN-to-PIN method. However, as the specification of the display apparatus 100 becomes high, the number of pins and wires connected to the data driver 130 is increased, thereby increasing the layout complexity of the PCB or IC and increasing manufacturing costs.

The inventors of the present disclosure recognized the above-mentioned problems and have invented a display apparatus capable of reducing the number of wires and pins for input and output of power by sharing driving voltages used in a data driver.

Hereinafter, a display apparatus capable of reducing the number of wires and pins for input and output of power by sharing driving voltages used in a data driver according to the embodiment of the present disclosure will be described.

Figure 6:
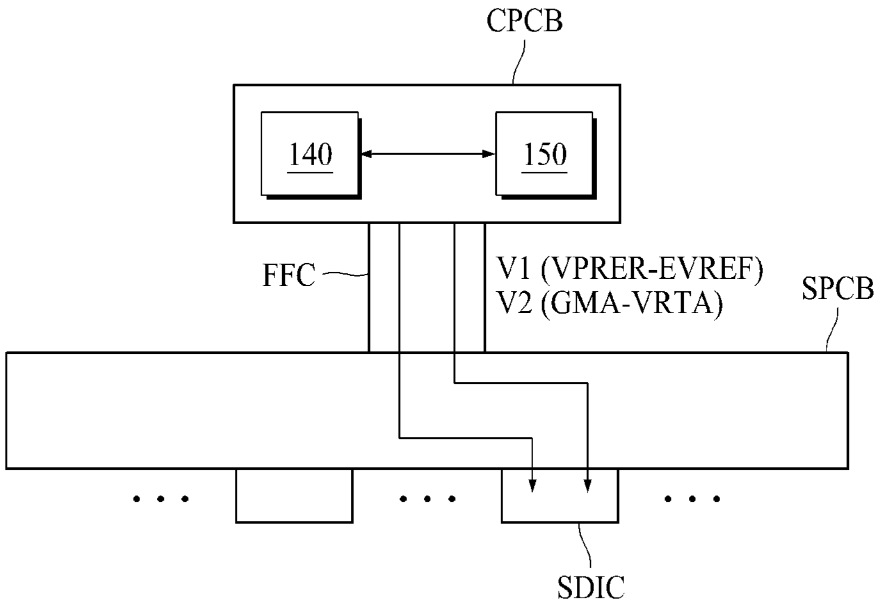
FIG. 6 illustrates a power wiring structure between a control printed circuit board and a source printed circuit board in the system of the display apparatus of FIG. 3 according to the embodiment of the present disclosure.

FIG. 6 illustrates a power wiring structure between the control printed circuit board and the source printed circuit board in the system of the display apparatus of FIG. 3 according to the embodiment of the present disclosure.

Referring to FIG. 6, in case of the display apparatus 100 according to the embodiment of the present disclosure, each source driving integrated circuit SDIC of the source printed circuit board SPCB may receive the various driving voltages required for the display driving and sensing driving of the display panel 110 from the power management integrated circuit 150 in the control printed circuit board CPCB.

The power management integrated circuit 150 may generate one or more common reference voltages where each common reference voltage includes driving voltages having the same or similar voltage level among the various driving voltages required for the display driving and sensing driving, where a common reference voltage may switch between the different driving voltages at different points of time and also may transmit the driving voltages to the source printed circuit board SPCB through the flexible flat cable FFC in the PIN-to-PIN method. Also, the power management integrated circuit 150 may generate one or more common reference voltages where each common reference voltage includes driving voltages whose voltage levels are variable and time points of switching between the variable voltage levels are different among the various driving voltages required for the display driving and sensing driving and then may transmit the driving voltages to the source printed circuit board SPCB through the flexible flat cable FFC in the PIN-to-PIN method.

The power management integrated circuit 150 may generate and output the various driving voltages required for the operation of all circuit configurations of the display apparatus 100 by using an input voltage supplied from the outside. For example, the power management integrated circuit 150 may generate and output the various driving voltages required for operations of the display panel 110, the gate driver 120, the data driver 130, the timing controller 140, and the like.

The power management integrated circuit 150 according to the embodiment of the present disclosure may generate a first common reference voltage V1 (a first common voltage) by sharing the driving voltages whose voltage levels are varied according to the required mode by adjusting the input voltage from the set board 170 and may supply the first common reference voltage V1 to each source driving integrated circuit SDIC through a single PIN and wiring (e.g., a first PIN and a first voltage wiring). That is, the first common reference voltage V1 changes between a plurality of different voltage levels where each of the different voltage levels corresponds to at least one of driving voltages based on a mode of operation of the display apparatus 100. For example, the first common reference voltage V1 may include a plurality of first voltage levels corresponding to the display reference voltage VPRER required for the display driving and a plurality of second voltage levels corresponding to the sampling reference voltage EVREF required for the sensing driving. The display reference voltage VPRER is a setup voltage applied to the second node N2 corresponding to the source node of the driving transistor DRT of the subpixel SP when the display is driven, and may be a voltage that is variable by the power management integrated circuit 150. That is, the display reference voltage VPRER may change between the plurality of first voltage levels. In addition, the sampling reference voltage EVREF is a voltage which is varied to the different voltage levels according to the sensing mode of sensing driving, which may be a voltage that is variable by the power management integrated circuit 150. For example, the sampling reference voltage EVREF may change between 3V or 0.5V (e.g., second voltage levels) depending on the sensing mode of the sensing driving. The voltage level of the first common reference voltage V1 may be varied by the power management integrated circuit 150 under the control of the timing controller 140. The timing controller 140 may transmit a voltage selection control signal Sel to the data driver 130, wherein the voltage selection control signal Sel makes the first common reference voltage V1 be selectively used in the data driver 130 according to the display driving or sensing driving.

The power management integrated circuit 150 according to the embodiment of the present disclosure may generate a second common reference voltage V2 by sharing the driving voltages whose voltage levels are the same or similar (e.g., within a predetermined range of each other) by adjusting the input voltage from the set board 170 and may supply the second common reference voltage V2 to each source driving integrated circuit SDIC through a single PIN and wiring (e.g., a second PIN and a second wiring). That is, the second PIN/second wiring receive the second comment reference voltage V2 having different voltage levels depending on the mode of operation of the display apparatus 100. For example, the second common reference voltage V2 may include at least one of the plurality of gamma reference voltages GMA serving as the reference of the gamma curve and the thermal characteristic sensing voltage VRTA required for sensing the thermal characteristic of the analog-to-digital converter. The plurality of gamma reference voltages GMA may respectively have the different voltage levels, and the specific gamma reference voltage GMA among the plurality of gamma reference voltages GMA may be set to a voltage range of 4V~5V. In addition, the thermal characteristic sensing voltage VRTA may be set to a voltage of about 5V, for example, 4.5V which is within the range of the gamma reference voltages GMA. The second common reference voltage V2 may be generated by the power management integrated circuit 150 under the control of the timing controller 140. The timing controller 140 may transmit the voltage selection control signal SEL to the data driver 130 to selectively use the second common reference voltage V2 according to the display driving or the thermal characteristic sensing driving in the data driver 130.

Figure 7:
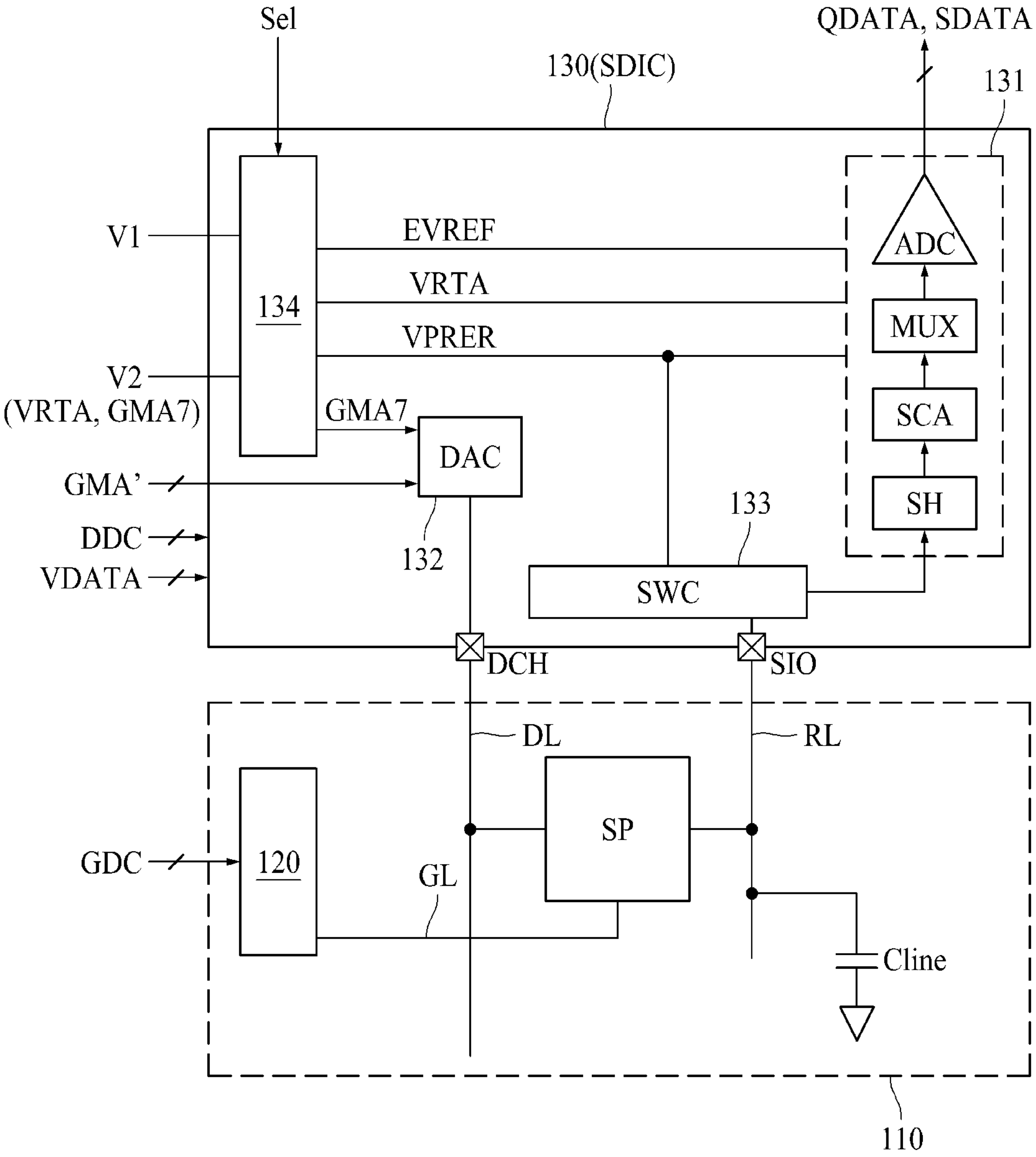
FIG. 7 is a diagram illustrating a configuration of a data driver to which the power wiring structure of FIG. 6 is applied according to the embodiment of the present disclosure.

FIG. 7 is a diagram illustrating a configuration of the data driver to which the power wiring structure of FIG. 6 is applied according to the embodiment of the present disclosure.

Referring to FIG. 7, the data driver 130 (or source driving integrated circuit SDIC) according to the embodiment of the present disclosure may be connected to the first node N1 (connected to the gate node of the driving transistor) of the subpixel SP through the data line DL, and may be connected to the second node N2 of the subpixel SP (connected to the source node of the driving transistor) through the reference line RL.

Since the source voltage in which the driving characteristic of the subpixel SP is reflected is charged in the second node N2 of the subpixel SP, the reference line RL connected to the second node N2 through the sensing transistor may be used as the sensing line. The line capacitor for storing the source voltage may be connected to the reference line RL functioning as the sensing line.

The data driver 130 may include the sensing portion 131 (e.g., a circuit), the data voltage generating portion 132 (e.g., a circuit), the switch circuit SWC 133, a voltage switching circuit 134, and the like.

The voltage switching circuit 134 is connected to a first common reference voltage terminal and a second common reference voltage terminal connected to the source printed circuit board SPCB through the flexible flat cable FFC in the PIN-to-PIN method from the control printed circuit board CPCB, and is configured to selectively supply the first common reference voltage V1 and the second common reference voltage V2 to the sensing portion 131, the data voltage generating portion 132, and the switch circuit SWC 133 according to the voltage selection control signal Sel applied from the timing controller 140. For example, the voltage switching circuit 134 may supply a first common reference voltage V1 to the reference line RL of the display panel 110 through the switch circuit 133 as the display reference voltage VPRER in the display driving according to the voltage selection control signal Sel applied from the timing controller 140, and may supply the first common reference voltage V1 to the sensing portion 131 as the sampling reference voltage EVREF in the sensing driving. In addition, the voltage switching circuit 134 may supply the second common reference voltage V2 as the specific gamma reference voltage GMA7 to the data voltage generating portion 132 in the display driving according to the voltage selection control signal Sel applied from the timing controller 140 and also may supply the second common reference voltage V2 to the sensing portion 131 as the thermal characteristic sensing voltage VRTA in the thermal characteristic sensing driving. For example, the power management integrated circuit 150 may supply the plurality of gamma reference voltages GMA' other than the specific gamma reference voltage GMA7 to the data driver 130, and the voltage switching circuit 134 may supply the second common reference voltage V2 to the data voltage generating portion 132 as the specific gamma reference voltage GMA7 excluded from the plurality of gamma reference voltages GMA'.

The data voltage generating portion 132 may be connected to the data line DL of the display panel 110 through the data channel DCH. The data voltage generating portion 132 may be implemented as the digital-to-analog converter DAC for generating the data voltage for the display driving and sensing driving.

The data voltage generating portion 132 receives the data timing control signal DDC and digital image data VDATA from the timing controller 140, latches the digital image data VDATA, converts the latched digital image data VDATA into the analog data signal, and supplies the analog data signal to the data line DL of the display panel 110 through the data channel terminal DCH.

The data voltage generating portion 132 according to the embodiment of the present disclosure receives the plurality of gamma reference voltages GMA' supplied directly from the power management integrated circuit 150 and the second common reference voltage V2 supplied from the power management integrated circuit 150 through the voltage switching circuit 134 as the specific gamma reference voltage GMA7 in the display driving, subdivides the received data into the plurality of grayscale voltages corresponding to grayscale values of data using the plurality of gamma reference voltages GMA' and the specific gamma reference voltage GMA7, converts the digital image data VDATA into the analog data voltage by using the subdivided grayscale voltages, and supplies the data voltage to each of the data lines DL of the display panel 110. Also, the data voltage generating portion 132 may generate the preset sensing data voltage in the sensing driving and may supply the sensing data voltage to the data line DL of the display panel 110 through the data channel terminal DCH.

The switch circuit SWC 133 according to the embodiment of the present disclosure may receive the first common reference voltage V1, which is supplied from the power management integrated circuit 150 in the display driving, as the display reference voltage VPRER through the voltage switching circuit 134. The switch circuit SWC 133 may supply the display reference voltage VPRER to the reference line RL of the display panel 110 through the sensing channel terminal SIO for the setup operation of the display driving. The display reference voltage VPRER may be a setup voltage applied to the second node N2 corresponding to the source node of the driving transistor DRT of the subpixel SP in the display driving. The first common reference voltage V1 may be a voltage varied to the display reference voltage VPRER by the power management integrated circuit 150 under the control of the timing controller 140.

The sensing portion 131 according to the embodiment of the present disclosure may receive the first common reference voltage V1 supplied from the power management integrated circuit 150 as the sampling reference voltage EVREF through the voltage switching circuit 134 for the sensing driving. The first common reference voltage V1 may be a voltage changed to the sampling reference voltage EVREF by the power management integrated circuit 150 under the control of the timing controller 140. The sampling reference voltage EVREF may be varied to the different voltage levels according to the sensing mode of the sensing driving. The sensing mode of the sensing driving may include the first sensing mode (or Smode sensing) for sensing the threshold voltage of the driving transistor DRT of the subpixel SP and the second sensing mode (or Fmode sensing) for sensing the mobility of the driving transistor DRT of the subpixel SP. The first common reference voltage V1 may be set as the first sampling reference voltage value in the first sensing mode and may be set to the second sampling reference voltage value lower than the first sampling reference voltage in the second sensing mode. For example, the first sampling reference voltage value may be set to a voltage of 3V, and the second sampling reference voltage value may be set to a voltage of 0.5V. The first common reference voltage V1 may be the voltage changed to the sampling reference voltage EVREF having the first sampling reference voltage value or second sampling reference voltage value by the power management integrated circuit 150 under the control of the timing controller 140.

The sensing portion 131 may include the sample and hold portion SH, the scaling portion SCA, the MUX portion MUX, the analog-to-digital converter ADC, and the like. The scaling portion SCA and the MUX may be omittable.

The sample and hold portion SH may receive the sampling reference voltage EVREF through the voltage switching circuit 134. The sample and hold portion SH may include the sampling capacitor which stores the voltage of the second node N2 of the driving transistor DRT of the subpixel SP input from the sensing channel terminal SIO in the first sensing sequence in which the scan signal applied to the subpixel SP maintains the on-level.

The scaling portion SCA receives the voltage stored in the sample and hold portion SH and level-converts the input voltage according to the sensing range of the analog-to-digital converter ADC. The MUX portion MUX multiplexes the outputs of the scaling portion SCA and supplies the multiplexed outputs to the analog-to-digital converter ADC in accordance with the output order.

The analog-to-digital converter ADC may receive the sampling reference voltage EVREF through the voltage switching circuit 134. The analog-to-digital converter ADC may convert the analog outputs input from the scaling portion SCA into the digital value and may output result data SDATA by the sensing driving.

The sensing portion 131 according to the embodiment of the present disclosure may be supplied with the second common reference voltage V2 supplied from the power management integrated circuit 150 through the voltage switching circuit 134 as the thermal characteristic sensing voltage VRTA in the thermal characteristic sensing driving. The sensing portion 131 transmits the thermal characteristic sensing voltage VRTA supplied through the voltage switching circuit 134 in the thermal characteristic sensing mode to the analog-to-digital converter ADC, and the output data sampled by the analog-to-digital converter ADC may be output as the output characteristic data QDATA of the analog-to-digital converter ADC.

Figures 8, 9:
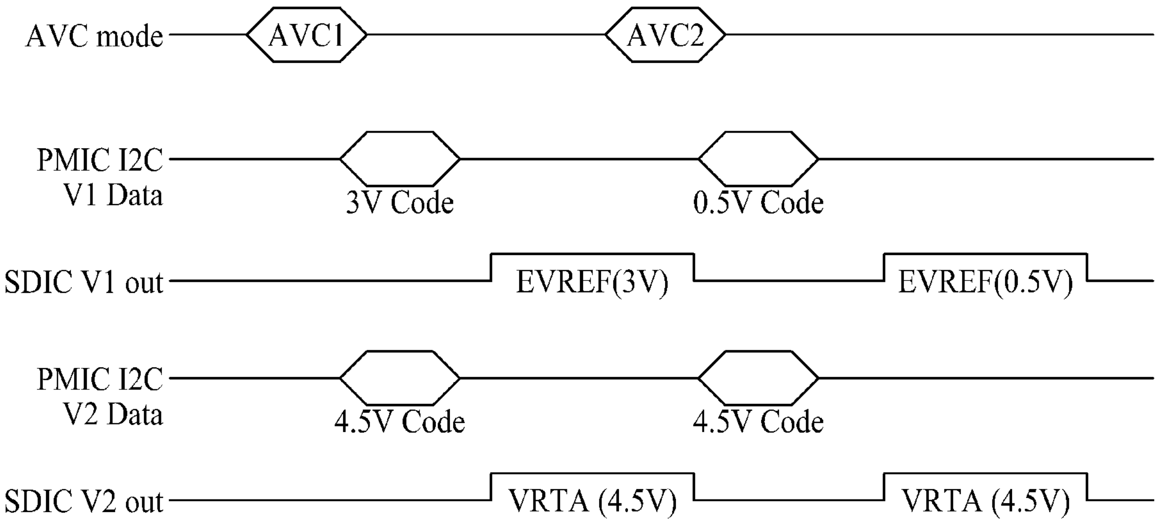
FIG. 8 is a diagram illustrating a voltage selection control signal Sel transmitted from a timing controller to a data driver according to the embodiment of the present disclosure.
FIG. 9 is a diagram illustrating signal data and output voltage during a thermal characteristic sensing driving in the display apparatus according to the embodiment of the present disclosure.

FIG. 8 is a diagram illustrating the voltage selection control signal Sel transmitted from the timing controller to the data driver that selects a mode of operation of the display apparatus from a plurality of different modes of operation according to the embodiment of the present disclosure.

Referring to FIG. 8, the voltage selection control signal SEL transmitted from the timing controller to the data driver according to the embodiment of the present disclosure may be implemented as 2 bit signal data. For example, the voltage selection control signal Sel may be a data packet using an Embedded Clock Point-Point Interface EPI protocol.

Responsive to both the 'S1' and 'S0' values of 2 bits being '0', the voltage selection control signal Sel indicates a display driving mode and the first common reference voltage V1 is set as the display reference voltage VPRER, and the second common reference voltage V2 is set as the gamma reference voltage GMA7.

Responsive to the 'S1' value of 2 bits being '0' and the 'S0' being is '1', the voltage selection control signal Sel indicates the first sensing mode Smode of the sensing driving, and the first common reference voltage V1 may be set as the sampling reference voltage EVREF and the second common reference voltage V2 is not set (e.g., not received by the data driver). For example, in the first sensing mode Smode, the sampling reference voltage EVREF may be set to 3V.

Responsive to the 'S1' value of 2 bits being '1' and the 'S0' value being '0', the voltage selection control signal Sel indicates the second sensing mode Fmode of the sensing driving, and the first common reference voltage V1 may be set as the sampling reference voltage EVREF and the second common reference voltage V2 is not set (e.g., not received by the data driver). For example, in the second sensing mode Fmode, the sampling reference voltage EVREF may be set to 0.5V.

Responsive to both the 'S1' and 'S0' values of 2 bits being '1', the voltage selection control signal Sel indicates the thermal characteristic sensing mode AVC, the first common reference voltage V1 is set as the sampling reference voltage EVREF, and the second common reference voltage V2 may be set as the thermal characteristic sensing voltage VRTA. In the thermal characteristic sensing mode AVC, the sampling reference voltage EVREF may be applied as the voltage varied at least once. For example, the thermal characteristic sensing mode AVC may sequentially perform a first thermal characteristic sensing driving AVC1 for setting the sampling reference voltage EVREF to 3V and a second thermal characteristic sensing drive AVC2 for setting the sampling reference voltage EVREF to 0.5V.

FIG. 9 is a diagram illustrating signal data and output voltage during the thermal characteristic sensing driving in the display apparatus according to the embodiment of the present disclosure.

Referring to FIG. 9, for the thermal characteristic sensing driving, if the thermal characteristic sensing driving is the first thermal characteristic sensing mode AVC1, the timing controller 140 may transmit signal data indicating that the voltage level of the first common reference voltage V1 is set to 3V to the power management integrated circuit 150, and may transmit signal data indicating that the voltage level of the second common reference voltage V2 is set to 4.5V to the power management integrated circuit 150. The power management integrated circuit 150 may output the first common reference voltage V1 as the sampling reference voltage EVREF set to 3V and may output the second common reference voltage V2 as the thermal characteristic sensing voltage VRTA set to 4.5V.

Then, if the thermal characteristic sensing driving is the second thermal characteristic sensing mode AVC2, the timing controller 140 may transmit signal data indicating that the voltage level of the first common reference voltage V1 switches from 3V (e.g., a first voltage level) to 0.5V (e.g., a second voltage level) to the power management integrated circuit 150, and may transmit signal data indicating that the voltage level of the second common reference voltage V2 is maintained at 4.5V (e.g., a third voltage level) to the power management integrated circuit 150. The power management integrated circuit 150 may output the first common reference voltage V1 as the sampling reference voltage EVREF set to 0.5V and may output the second common reference voltage V2 as the thermal characteristic sensing voltage VRTA set to 4.5V. Thus, the second common reference voltage V2 is at the third voltage level of 4.5 V while the first common reference voltage is at the first voltage level of 3V and the second common reference voltage V2 is at the third voltage level of 4.5 V while the first common reference voltage is at the second voltage level of 0.5 V.

Figure 10:
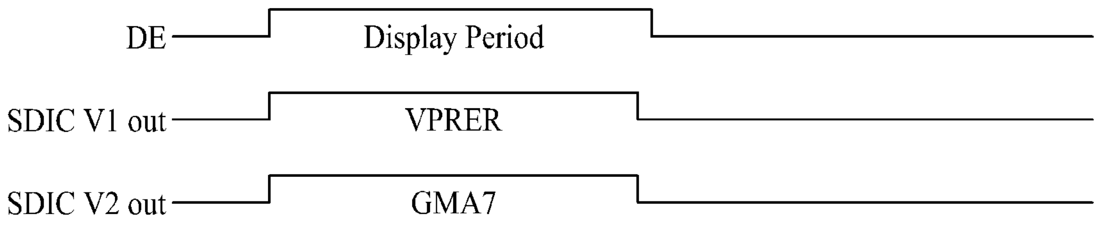
FIG. 10 is a diagram illustrating signal data and output voltage during a display driving in the display apparatus according to the embodiment of the present disclosure.

FIG. 10 is a diagram illustrating signal data and output voltage during the display driving in the display apparatus according to the embodiment of the present disclosure.

Referring to FIG. 10, the timing controller 140 may transmit the data enable signal DE to the data driver 130 for the display driving, and the power management integrated circuit 150 may output the first common reference voltage V1 as the display reference voltage VPRER for the display period defined by the data enable signal DE under the control of the timing controller 140, and may output the second common reference voltage V2 as the gamma reference voltage GMA7.

Figure 11:
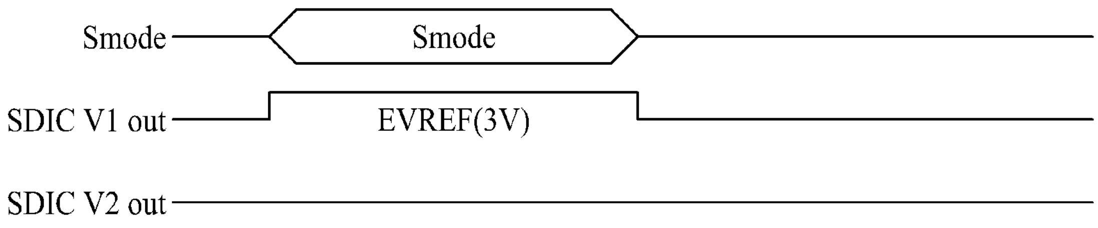
FIG. 11 is a diagram illustrating signal data and output voltage during a first sensing mode in the display apparatus according to the embodiment of the present disclosure.

FIG. 11 is a diagram illustrating signal data and output voltage during the first sensing mode in the display apparatus according to the embodiment of the present disclosure.

Referring to FIG. 11, the power management integrated circuit 150 may output the first common reference voltage V1 whose voltage level is set to 3V as the sampling reference voltage EVREF for the first sensing mode Smode of the sensing driving under the control of the timing controller 140. In the first sensing mode Smode, the second common reference voltage V2 may not be generated or may not be output.

Figure 12:
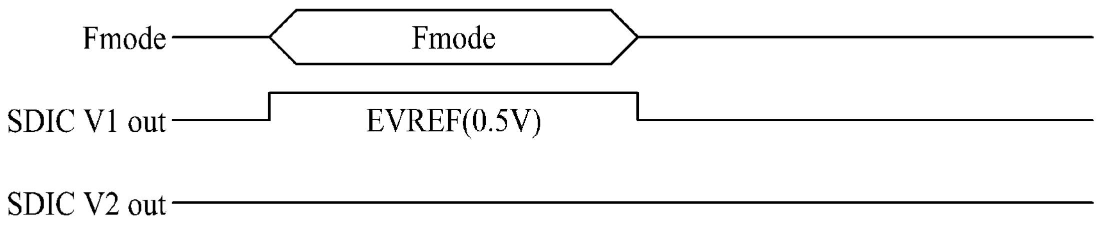
FIG. 12 is a diagram illustrating signal data and output voltage during a second sensing mode in the display apparatus according to the embodiment of the present disclosure.

FIG. 12 is a diagram illustrating signal data and output voltage during the second sensing mode in the display apparatus according to the embodiment of the present disclosure.

Referring to FIG. 12, the power management integrated circuit 150 may output the first common reference voltage V1 whose voltage level is set to 0.5V as the sampling reference voltage EVREF for the second sensing mode Fmode of the sensing driving under the control of the timing controller 140. In the second sensing mode Fmode, the second common reference voltage V2 may not be generated or may not be output.

A display apparatus according to the embodiment of the present disclosure may be described as follows.

A display apparatus according to an embodiment of the present disclosure may include a display panel including a plurality of data lines, a plurality of reference lines, and a plurality of subpixels, a data driver configured to supply a data voltage to the plurality of data lines and to supply a reference voltage to the plurality of reference lines, a power supplier configured to supply a plurality of driving voltages to the data driver, and a timing controller configured to control the data driver and the power supplier, the power supplier being controlled by the timing controller to supply to the data driver a common voltage by sharing at least a portion of the plurality of driving voltages.

In the display apparatus according to an embodiment of the present disclosure, the common voltage may include the driving voltages within a predetermined voltage level range among the plurality of driving voltages.

In the display apparatus according to an embodiment of the present disclosure, the common voltage may include the driving voltages capable of varying a voltage level among the plurality of driving voltages.

In the display apparatus according to an embodiment of the present disclosure, the driving voltages capable of varying a voltage level may alternate between at least two of a plurality of different voltage levels that correspond to the plurality of driving voltages.

In the display apparatus according to an embodiment of the present disclosure, the common voltage may include the driving voltages having different time points required for the data driver among the plurality of driving voltages.

In the display apparatus according to an embodiment of the present disclosure, the common voltage may include a first common reference voltage by sharing the driving voltages capable of varying in voltage levels among the plurality of driving voltages, and a second common reference voltage by sharing the driving voltages within a predetermined voltage level range among the plurality of driving voltages.

In the display apparatus according to an embodiment of the present disclosure, the second common reference voltage may include at least a portion of a plurality of gamma reference voltages and a thermal characteristic sensing voltage for sensing a thermal characteristic of the data driver.

In the display apparatus according to an embodiment of the present disclosure, the second common reference voltage may be set to a voltage range of 4V to 5V.

In the display apparatus according to an embodiment of the present disclosure, the first common reference voltage may include a display reference voltage for display driving during which an image is displayed by the display apparatus and a sampling reference voltage for sensing driving during which one or more characteristics of the plurality of subpixels are sensed.

In the display apparatus according to an embodiment of the present disclosure, the first common reference voltage may have a voltage level that alternates between different voltage levels according to a driving condition.

In the display apparatus according to an embodiment of the present disclosure, the sensing driving may include a first sensing mode during which a threshold voltage of a driving transistor included in a subpixel from the plurality of subpixels is sensed and a second sensing mode during which a mobility of the driving transistor is sensed, and the first common reference voltage may have a first voltage level from the plurality of different voltage levels during the first sensing mode and the first common reference voltage may have a second voltage level from the plurality of different voltage levels that is different from the first voltage level during the second sensing mode.

In the display apparatus according to an embodiment of the present disclosure, the second voltage level may be less than the first voltage level.

In the display apparatus according to an embodiment of the present disclosure, the power supplier may vary the voltage level of the first common reference voltage to switch between the different voltage levels and output the varied voltage level of the first common reference voltage according to a control of the timing controller.

In the display apparatus according to an embodiment of the present disclosure, the data driver may include a data voltage generating portion configured to generate the data voltage supplied to the plurality of data lines, a sensing portion configured to sense a sensing voltage through the plurality of reference lines, and a voltage switching circuit applied with the common voltage and configured to selectively supply the common voltage to the data voltage generating portion and the sensing portion.

In the display apparatus according to an embodiment of the present disclosure, the timing controller may supply a voltage selection control signal to the data driver, the voltage selection control signal controlling the voltage switching circuit to supply the common voltage to at least one of the data voltage generating portion or the sensing portion.

In the display apparatus according to an embodiment of the present disclosure, a value of the voltage selection control signal may indicate a driving condition of the data driver using the common voltage.

In the display apparatus according to an embodiment of the present disclosure, a value of the voltage selection control signal may be a data packet using an Embedded Clock Point-Point Interface EPI protocol.

In the display apparatus according to an embodiment of the present disclosure, the driving condition of the data driver may include at least one of a display driving mode during which an image is displaying, a sensing driving mode during which a characteristic of the plurality of subpixels is sensed, and a data driver sensing mode during which a characteristic of the data driver is sensed.

In the display apparatus according to an embodiment of the present disclosure, the sensing portion of the data driver may include an analog-to-digital converter, and a thermal characteristic of the analog-to-digital converter may be sensed during the data driver sensing mode.

A display apparatus according to an embodiment of the present disclosure may include a display panel including a plurality of data lines, a plurality of reference lines, and a plurality of subpixels, a power supplier configured to generate a first common reference voltage and a second common reference voltage, and a data driver configured to supply a data voltage to the plurality of data lines and to supply a reference voltage to the plurality of reference lines based on the first common reference voltage and the second common reference voltage, the data driver receiving the first common reference voltage via a first wiring and the second common reference voltage via a second wiring that is different from the first wiring, a voltage level of the first common reference voltage and a voltage level of the second common reference voltage may change in accordance with a selected mode of operation from a plurality of different modes of operation of the display apparatus.

In the display apparatus according to an embodiment of the present disclosure, during a display driving mode during which an image is displayed by the display apparatus, the first common reference voltage may be a display reference voltage having a variable voltage that is supplied to a reference line from the plurality of reference lines and the second common reference voltage may be a gamma reference voltage supplied to a data line from the plurality of data lines.

In the display apparatus according to an embodiment of the present disclosure, during a first sensing mode during which a first characteristic of a subpixel from the plurality of subpixels is sensed, the first common reference voltage may be a first sampling reference voltage having a first voltage level that is supplied to a reference line from the plurality of reference lines and the second common reference voltage may not be received by the data driver.

In the display apparatus according to an embodiment of the present disclosure, during a second sensing mode during which a second characteristic of the subpixel is sensed that is different from the first characteristic, the first common reference voltage may be a second sampling reference voltage having a second voltage level that is less than the first voltage level and is supplied to the reference line, and the second common reference voltage may not be received by the data driver.

In the display apparatus according to an embodiment of the present disclosure, may further include a data voltage generating portion configured to generate the data voltage supplied to the plurality of data lines, a sensing portion configured to sense a sensing voltage through the plurality of reference lines responsive to the reference voltage, a voltage switching circuit applied with the first common reference voltage and the second common reference voltage and configured to selectively supply the first common reference voltage and the second common reference voltage to the data voltage generating portion and the sensing portion, and an analog-to-digital converter (ADC).

In the display apparatus according to an embodiment of the present disclosure, during a thermal characteristic sensing mode during which a thermal characteristic of the ADC is sensed, the first common reference voltage may be a first sampling reference voltage that switches between a first voltage level and a second voltage level that is less than the first voltage level, and the second common reference voltage may be a third voltage level while the first sampling reference voltage is at the first voltage level and while the first sampling reference voltage is at the second voltage level.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure. It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:

a display panel including a plurality of data lines, a plurality of reference lines, and a plurality of subpixels;

a data driver configured to supply a data voltage to the plurality of data lines and to supply a reference voltage to the plurality of reference lines;

a power supplier configured to supply a plurality of driving voltages to the data driver; and a timing controller configured to control the data driver and the power supplier, the power supplier being controlled by the timing controller to generate a common reference voltage based on at least a portion of the plurality of driving voltages, the common reference voltage being supplied to the data driver, wherein the portion of the plurality of driving voltages includes driving voltages that alternate between at least two of a plurality of different voltage levels and driving voltages that are within a predetermined voltage level range from each other.

2. The display apparatus according to claim 1, wherein the common reference voltage is switched between different driving voltages at different points of time.

3. The display apparatus according to claim 1, wherein the common reference voltage includes a first common reference voltage generated by sharing the driving voltages that alternate between the at least two of the plurality of different voltage levels among the portion of the plurality of driving voltages, and a second common reference voltage generated by sharing the driving voltages that are within the predetermined voltage level range from each other among the portion of the plurality of driving voltages.

4. The display apparatus according to claim 3, wherein the second common reference voltage includes at least a portion of a plurality of gamma reference voltages and a thermal characteristic sensing voltage for sensing a thermal characteristic of the data driver.

5. The display apparatus according to claim 4, wherein the second common reference voltage is set to a voltage range of 4V to 5V.

6. The display apparatus according to claim 3, wherein the first common reference voltage includes a display reference voltage for display driving during which an image is displayed by the display apparatus and a sampling reference voltage for sensing driving during which one or more characteristics of the plurality of subpixels are sensed.

7. The display apparatus according to claim 6, wherein the first common reference voltage has a voltage level that alternates between different voltage levels according to a driving condition.

8. The display apparatus according to claim 7, wherein the sensing driving includes a first sensing mode during which a threshold voltage of a driving transistor included in a subpixel from the plurality of subpixels is sensed and a second sensing mode during which a mobility of the driving transistor is sensed, and wherein the first common reference voltage has a first voltage level from a plurality of different voltage levels during the first sensing mode and the first common reference voltage has a second voltage level from the plurality of different voltage levels that is different from the first voltage level during the second sensing mode.

9. The display apparatus according to claim 8, wherein the second voltage level is less than the first voltage level.

10. The display apparatus according to claim 7, wherein the power supplier varies the voltage level of the first common reference voltage to switch between the different voltage levels and outputs the varied voltage level of the first common reference voltage according to a control of the timing controller.

11. The display apparatus according to claim 1, wherein the data driver includes:

a data voltage generating portion configured to generate the data voltage supplied to the plurality of data lines;

a sensing portion configured to sense a sensing voltage through the plurality of reference lines; and a voltage switching circuit applied with the common reference voltage and configured to selectively supply the common reference voltage to the data voltage generating portion and the sensing portion.

12. The display apparatus according to claim 11, wherein the timing controller supplies a voltage selection control signal to the data driver, the voltage selection control signal controlling the voltage switching circuit to supply the common reference voltage to at least one of the data voltage generating portion or the sensing portion.

13. The display apparatus according to claim 12, wherein a value of the voltage selection control signal indicates a driving condition of the data driver using the common reference voltage.

14. The display apparatus according to claim 13, wherein the driving condition of the data driver includes at least one of a display driving mode during which an image is displaying, a sensing driving mode during which a characteristic of the plurality of subpixels is sensed, and a data driver sensing mode during which a characteristic of the data driver is sensed.

15. The display apparatus according to claim 14, wherein the sensing portion of the data driver includes an analog-to-digital converter, and a thermal characteristic of the analog-to-digital converter is sensed during the data driver sensing mode.

16. The display apparatus according to claim 12, wherein a value of the voltage selection control signal is a data packet using an Embedded Clock Point-Point Interface EPI protocol.

17. A display apparatus comprising:

a display panel including a plurality of data lines, a plurality of reference lines, and a plurality of subpixels;

a power supplier configured to generate a first common reference voltage and a second common reference voltage; and a data driver configured to supply a data voltage to the plurality of data lines and to supply a reference voltage to the plurality of reference lines based on the first common reference voltage and the second common reference voltage, the data driver receiving the first common reference voltage via a first wiring and the second common reference voltage via a second wiring that is different from the first wiring, wherein a voltage level of the first common reference voltage and a voltage level of the second common reference voltage change in accordance with a selected mode of operation from a plurality of different modes of operation of the display apparatus, wherein the power supplier is configured to generate the first common reference voltage and the second common reference voltage based on at least a portion of a plurality of driving voltages, and wherein the portion of the plurality of driving voltages includes driving voltages that alternate between at least two of a plurality of different voltage levels and driving voltages that are within a predetermined voltage level range from each other.

18. The display apparatus of claim 17, wherein during a display driving mode during which an image is displayed by the display apparatus, the first common reference voltage is a display reference voltage having a variable voltage that is supplied to a reference line from the plurality of reference lines and the second common reference voltage is a gamma reference voltage supplied to a data line from the plurality of data lines.

19. The display apparatus of claim 17, wherein during a first sensing mode during which a first characteristic of a subpixel from the plurality of subpixels is sensed, the first common reference voltage is a first sampling reference voltage having a first voltage level that is supplied to a reference line from the plurality of reference lines and the second common reference voltage is not received by the data driver.

20. The display apparatus of claim 19, wherein during a second sensing mode during which a second characteristic of the subpixel is sensed that is different from the first characteristic, the first common reference voltage is a second sampling reference voltage having a second voltage level that is less than the first voltage level and is supplied to the reference line, and the second common reference voltage is not received by the data driver.

21. The display apparatus of claim 17, further comprising:

a data voltage generating portion configured to generate the data voltage supplied to the plurality of data lines;

a sensing portion configured to sense a sensing voltage through the plurality of reference lines responsive to the reference voltage;

a voltage switching circuit applied with the first common reference voltage and the second common reference voltage and configured to selectively supply the first common reference voltage and the second common reference voltage to the data voltage generating portion and the sensing portion; and an analog-to-digital converter (ADC).

22. The display apparatus of claim 21, wherein during a thermal characteristic sensing mode during which a thermal characteristic of the ADC is sensed, the first common reference voltage is a first sampling reference voltage that switches between a first voltage level and a second voltage level that is less than the first voltage level, and the second common reference voltage is a third voltage level while the first sampling reference voltage is at the first voltage level and while the first sampling reference voltage is at the second voltage level.

* * * * *